(No Model.) 2 Sheets—Sheet 1.
H. A. COLLINS.
FILTER OR OIL EXTRACTOR.
No. 573,766. Patented Dec. 22, 1896.
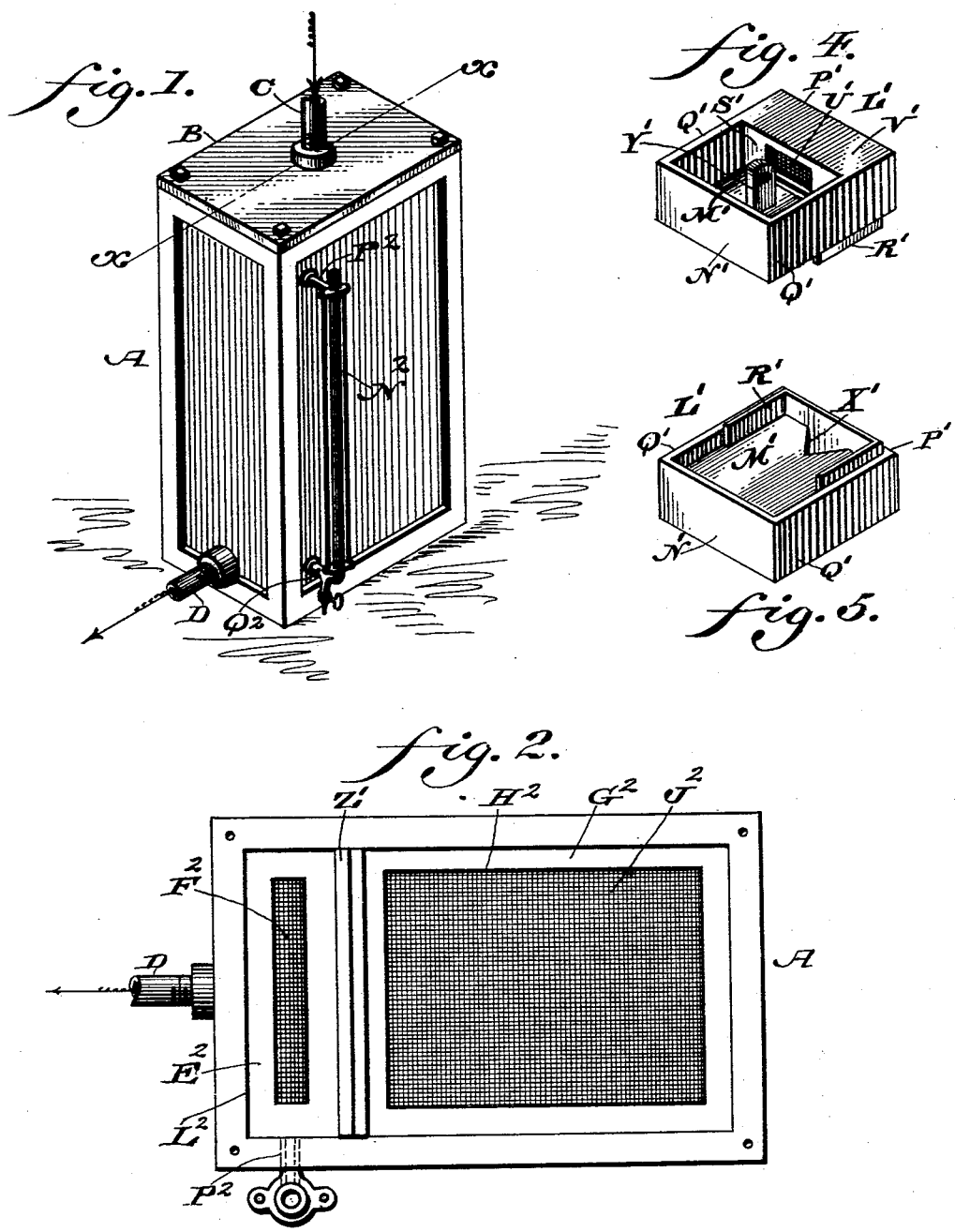
WITNESSES:
L. Douville,
P. H. Chagle
INVENTOR
Henry A. Collins
BY
John A. Wedersheim
ATTORNEY.
THE NORRIS PETERS CO., PHOTO-LITHO., WASHINGTON, D. C.

(No Model.) 2 Sheets—Sheet 2.
H. A. COLLINS.
FILTER OR OIL EXTRACTOR.
No. 573,766. Patented Dec. 22, 1896.
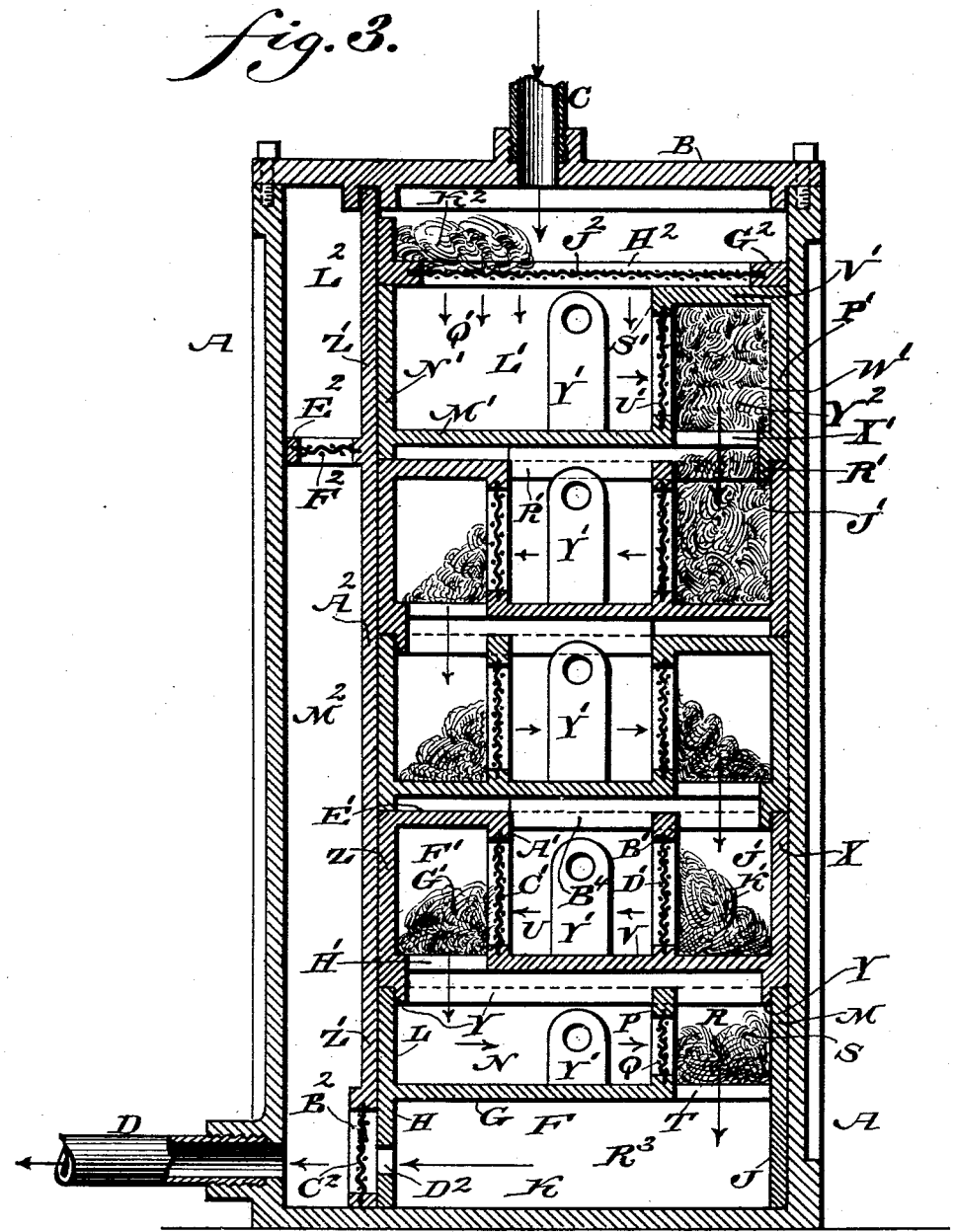
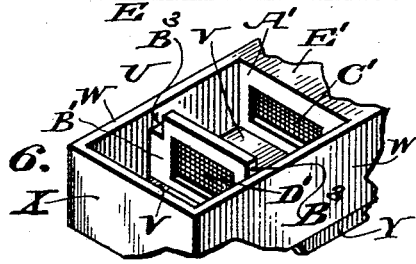

UNITED STATES PATENT OFFICE.

HENRY A. COLLINS, OF BROOKLYN, NEW YORK.

FILTER OR OIL-EXTRACTOR.

SPECIFICATION forming part of Letters Patent No. 573,766, dated December 22, 1896.

Application filed July 8, 1896. Serial No. 598,411. (No model.)

*To all whom it may concern:*

Be it known that I, HENRY A. COLLINS, a citizen of the United States, residing at Brooklyn, in the county of Kings, State of New York, have invented a new and useful Improvement in Filters or Oil-Extractors, which improvement is fully set forth in the following specification and accompanying drawings.

My invention consists of a novel construction of filter and oil-extractor in which a plurality of boxes or compartments are employed, which are superimposed upon each other so that the entire structure can be readily dismantled for the purpose of cleaning or inspection.

It further consists of novel details of construction, all as will be hereinafter set forth, and specifically pointed out in the claims.

Figure 1 represents a perspective view of a filter and oil-extractor embodying my invention. Fig. 2 represents a top or plan view of the same with the cover removed. Fig. 3 represents, on an enlarged scale, a vertical section on line $x\ x$, Fig. 1. Figs. 4 and 5 represent perspective views of the top and bottom, respectively, of the upper filter-boxes. Fig. 6 represents a perspective view of a portion of the lower filter-box employed.

Similar letters of reference indicate corresponding parts in the several figures.

Referring to the drawings, A designates the casing of the apparatus, the same having in the present instance a cap or cover B applied thereto, which is provided with the inlet-pipe C, although it is evident that said cover B may be omitted, if desired, and the water sprayed directly into the top of the apparatus.

D designates an outlet-pipe, and E the base of the apparatus. The filter-boxes are superimposed upon each other, three different sets thereof being employed, the top and bottom boxes being of slightly-modified construction, while any desired number of intermediate boxes, also of different construction, may be employed, the construction of all of which being hereinafter set forth.

In order that the manner of assembling the boxes and the operation of the same may be fully understood, the steps of assembling and the construction of each box will be described in order.

F designates the lowest box, the same being provided with the partition G and the depending sides H, J, and K, the relative position of which will be clear from Fig. 3.

L, M, and N designate the upper sides of the boxes, which are projected upwardly above the partition G, the latter being provided with the upright partition P, located near an end thereof, said partition having a passage therethrough, which is provided with the screen or wire-gauze Q, thereby forming the compartment R, which is filled with suitable spongy or porous material, such as cotton, fiber, &c., whereby the impurities in the water will be arrested in their progress, the compartment R communicating through the passage T with the lower chamber $R^3$ of the filter.

U designates a chamber or filter-box which is superimposed upon the box F, the construction of which will be clear from Figs. 3 and 6, said chamber U being provided with the base or partition V in its lower portion and having the opposite sides W and the ends X and Z, the lower edges of said partition of said box U being flanged or provided with a projection Y, which extends in the present instance around the four sides of the box U, thereby rendering the same less liable to displacement upon the box F.

A' B' designate upright partitions which are attached to the base V and are provided with the wire screen or gauze C' D'.

E' designates a cover or strip which extends from the wall Z to the partition A', thereby forming a chamber F', within which is located suitable filtering material G', which may be sponge, fiber, cotton, &c., which serves to arrest the impurities in the water passing therethrough, said chamber F' having an outlet H', which leads into the chamber below.

J' designates a chamber open at the top, formed between the partition B' and the wall X, in which chamber is located the filtering material K'. The partition B' has its upper corners $B^3$ recessed, as indicated in Fig. 6, whereby the depending projection $B^4$ can readily seat therein.

The next series of the filter-boxes which are superimposed upon each other are substantially similar to the box U, already described, until the top box L' is reached, the construction of which will be understood from Figs. 3, 4, and 5, the box L' being provided with the base M' and the ends N' P' and the sides Q'.

R' designates a projection depending from said box, and S' designates a partition near an end thereof, the same having the screen U' therein and being joined by the top portion V', which is attached to the wall P', thereby forming the chamber W', which has an outlet X', leading into the chamber J' thereunder, said chamber W' having suitable filtering material Y² therein.

Y' designates devices which are attached to a suitable portion of each of the filter-boxes, whereby the latter can be readily removed, according to requirements.

Z' designates an upright strip of suitable material, the construction of which will be apparent from Figs. 2 and 3, the same having the body portion A², which is provided at its lower portion with the passage B² therethrough, in which is located the screen or netting C², through which the water must pass after leaving the exit D², before it finally escapes from the filter through the pipe D.

E² designates a laterally-extending partition which is attached to the body portion A², and has a passage therethrough in which is located the screen or netting F².

G² designates a partition which is superimposed upon the upper or top box L', and has the passage H² therethrough, in which is located the screen or netting J².

K² designates suitable filtering material which is supported upon the screen J², and which, it will be understood, in practice fills substantially the entire space above said screen J².

L² designates a chamber formed above the partition or member E', and M² designates a chamber formed below said partition.

N² designates a gage which is attached to the side of the filter, as indicated in Fig. 1, and is provided with the branches P² and Q² near either extremity, which communicate with the upper and lower chambers L² M², whereby the height of the purified water is indicated within the gage and can be withdrawn from the lower portion of the latter, while the height of the oil contained within the chamber L² is indicated in the upper portion of said gage and can be withdrawn therefrom in any suitable or convenient manner, as is evident.

The operation is as follows: The incoming water is directed first into the chamber above the screen J², and thence into the space intermediate said screen and the base M', and passes thence into the chamber W' and afterward into the chamber J' thereunder, and thence successively through the chambers F' J', and so on, as indicated by the arrows in Fig. 3, until it reaches the chamber R³, from which it is finally discharged in a clear and purified condition into the chamber M², and any oil remaining in said chamber will rise through the netting F² into the chamber L² and can be observed through the gage N². The purified water is withdrawn from the pipe D, and also from the bottom of the gage N², and the oil can be drawn from the top of the gage N², as has already been explained, it being, of course, understood that each of the chambers W', F', J', and R³ is substantially filled with the filtering material in practice, and that any number of filter-boxes can be superimposed upon each other in the manner described. The strip Z' can be dispensed with, if desired, but I preferably employ the same as a convenient means for holding the boxes in assembled position.

Having thus described my invention, what I claim as new, and desire to secure by Letters Patent, is—

1. A filter consisting of a plurality of boxes superimposed upon each other and provided with partitions, screens and filtering devices, a casing inclosing said boxes, an upright strip adjacent the latter and adapted to hold the same in position, the lower portion of said strip being provided with a passage having a screen therein, while the upper portion of said strip has a laterally-extending member with a screen therein, in combination with a partition supported upon the upper box, said partition having a passage therethrough with a screen therein.

2. In a filter, the herein-described filter-box, having sides and ends, and an open top and bottom, a laterally-extending partition located within said box so as to form upper and lower chambers, an upright partition located in the upper chamber and having a passage therethrough with a screen therein said passage leading to a chamber R, and a passage leading from the latter to the lower chamber of said box.

3. In a filter, the herein-described filter-box, consisting of the sides W and the ends X and Z, the inclosed chamber F' in one end of the said box, the outlet H' leading therefrom, suitable filtering material in said chamber F', a screen in a side thereof, a partition in the other end of the filter-box, whereby a chamber J' having an open top is formed, a screen in said partition, and filtering material in said chamber J'.

4. In a filter, a filter-box having inclosing sides and ends, a chamber in one end of said box having a closed top and open bottom, and an apertured side with a screen therein, a chamber in the opposite end of said box having an open top and closed bottom, and an apertured side with a screen therein, in combination with an intermediate chamber, having an imperforate bottom, and in communication with said end chambers.

5. A filter, consisting of the boxes L', F and U, constructed substantially as described and superimposed upon each other, a casing, a strip for holding said boxes in position, a partition $E^2$ provided with a screen interposed between said strip and said casing, a partition $G^2$ provided with the screen $J^2$ and supported upon the section $L'$, said strip $A^2$ being provided with a passage $B^2$ having the screen $C^2$ therein.

6. A filter consisting of a plurality of boxes superimposed upon each other and provided with filtering devices, a casing inclosing said boxes, an upright strip adjacent the latter and adapted to hold the same in position, the lower portion of said strip having a passage therethrough with a screen therein, while the upper portion of said strip has a laterally-extending member also with a screen therein, thereby forming upper and lower chambers for the reception of oil and purified water respectively, a screen supported on the upper box, an inlet for the upper portion of the filter, an outlet for purified water, and means for withdrawing oil from said upper chamber.

7. In a filter, an upper filter-box, consisting of a plurality of chambers, one of said chambers having an open top and imperforate bottom, and the adjacent chamber having a closed top and open bottom, and an upright screen separating said chambers, said box being of substantially uniform thickness throughout, and being provided with means for preventing it from shifting with respect to the adjacent box.

8. A filter consisting of upper, lower and intermediate filter-boxes, the upper box consisting of a plurality of chambers, one of the latter having an open top and closed bottom, while the adjacent chamber has a closed top and open bottom with an apertured partition separating said chambers, the intermediate boxes having end chambers and open tops and closed bottoms, and closed tops and open bottoms respectively, in communication with each other, and the lower box having upper and lower chambers, in combination with upper and lower oil and water chambers at a side of the filter, and means for withdrawing the contents of said latter chambers.

9. A filter consisting of upper, lower and intermediate filter-boxes, the upper box having a plurality of chambers, one of the latter having an open top and closed bottom, the adjacent chamber being separated therefrom by a screen and having a closed top and open bottom, a screen supported on said upper box, the intermediate boxes being provided with end chambers with screens therebetween, and having open tops and closed bottoms and closed tops and open bottoms respectively, in communication with each other, and the lower box having upper and lower chambers with filtering devices therein, in combination with means for withdrawing the oil and purified water from the filter.

HENRY A. COLLINS.

Witnesses:
WM. C. PEARSALL,
JAMES VAN ALST,
JOHN F. HART.